United States Patent [19]

Eggers

[11] Patent Number: 4,716,944
[45] Date of Patent: Jan. 5, 1988

[54] TUBULAR PLATE ELECTRODE SLURRY FILLING PROCESS AND APPARATUS FOR LEAD-ACID CELLS

[75] Inventor: Mark L. Eggers, Schaumburg, Ill.

[73] Assignee: KW Battery Company, Skokie, Ill.

[21] Appl. No.: 18,447

[22] Filed: Feb. 25, 1987

Related U.S. Application Data

[62] Division of Ser. No. 804,496, Dec. 4, 1985, Pat. No. 4,678,730.

[51] Int. Cl.$^4$ .......................... B65B 3/04; H01M 4/16
[52] U.S. Cl. ........................................ 141/1; 141/326; 141/1.1; 29/623.2
[58] Field of Search ............... 141/1.1, 1, 32, 234, 141/326; 29/623.1, 623.5, 623.2; 429/238, 140

[56] References Cited

U.S. PATENT DOCUMENTS

| | | | |
|---|---|---|---|
| 3,885,988 | 5/1975 | Bohle | 141/32 |
| 3,949,793 | 4/1976 | Peters et al. | 141/234 |
| 4,039,730 | 8/1977 | Brinkmann et al. | 429/212 |
| 4,076,058 | 2/1978 | Culpin et al. | 141/1.1 |
| 4,146,063 | 3/1979 | Karlsson | 141/1.1 |
| 4,366,214 | 12/1982 | Lindholm | 429/238 X |

Primary Examiner—Anthony Skapars
Attorney, Agent, or Firm—Ann W. Speckman; Thomas W. Speckman

[57] ABSTRACT

A process and apparatus is provided for filling tubular plate positive electrodes for use in lead-acid secondary cells with lead oxide particulate material in a highly fluid slurry form wherein tubular plate positive electrode assemblies comprising a plurality of substantially lead spines aligned on a conductive bar, each spine enveloped by a porous tubular sheath, are footed prior to being filled with lead oxide particulate material in a highly fluid slurry form. The foot according to the present invention comprises a plurality of aligned projections extending from a base portion and slurry access ports penetrating the foot. Each projection engages a spine within its spine recess and is itself engaged within a tubular sheath, and each projection is provided with at least one slurry access port. Lead oxide particulate material in a highly fluid slurry form is introduced into the annular space between each spine and its corresponding tubular sheath through the slurry access ports penetrating the foot.

20 Claims, 5 Drawing Figures

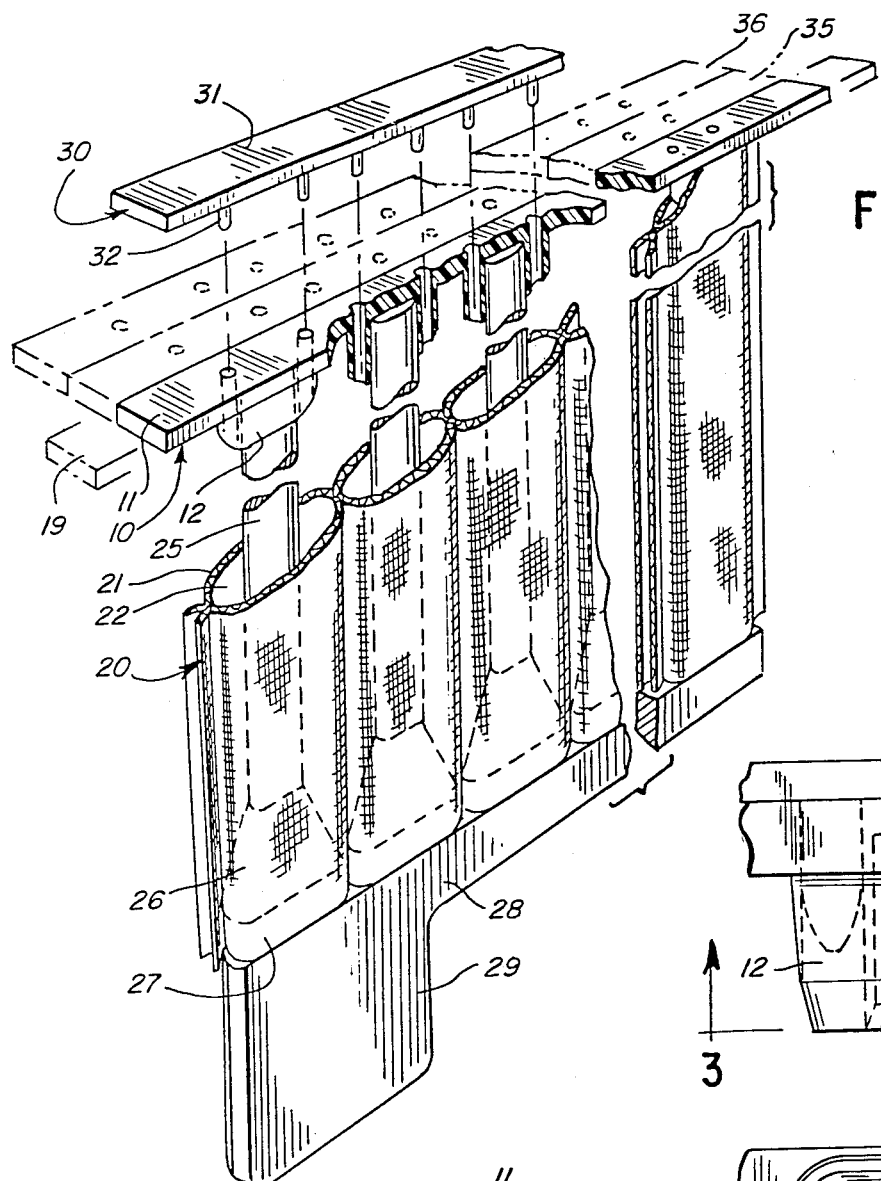
FIG. 1
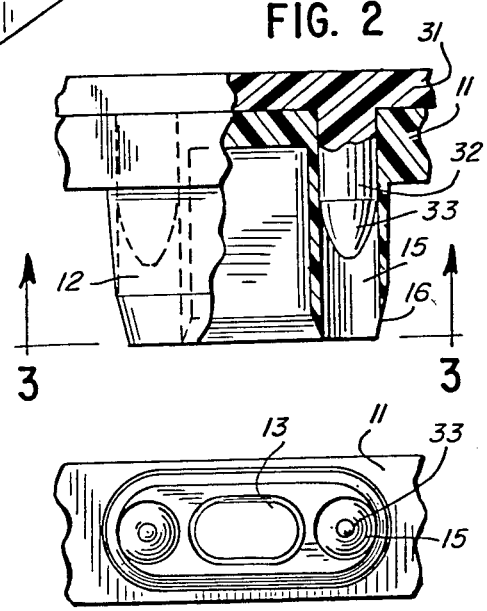
FIG. 2
FIG. 3
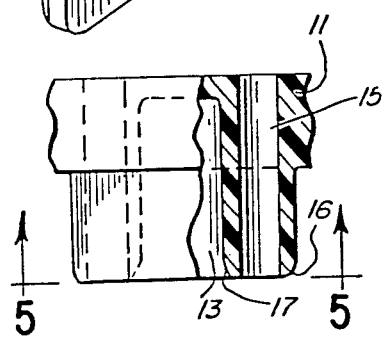
FIG. 4
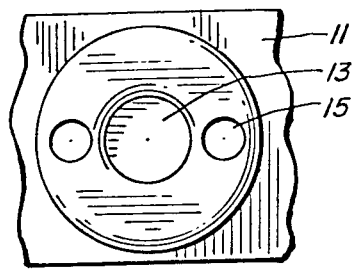
FIG. 5

TUBULAR PLATE ELECTRODE SLURRY FILLING PROCESS AND APPARATUS FOR LEAD-ACID CELLS

This is a divisional application of Ser. No. 804,496, filed Dec. 4, 1985, now U.S. Pat. No. 4,678,730.

BACKGROUND OF THE INVENTION

1. Field of the Invention

The present invention relates to a process and apparatus for filling tubular plate positive electrodes for use in lead-acid secondary cells with lead oxide particulate material in a highly fluid slurry form. According to the process of the present invention, tubular plate positive electrode assemblies comprising a plurality of substantially lead spines aligned on a conductive bar, each spine enveloped by a porous tubular sheath, are footed prior to being filled with lead oxide particulate material in a highly fluid slurry form. The foot according to the present invention has a plurality of aligned projections and slurry access ports. When the foot is installed on a tubular plate electrode assembly, each projection engages a spine in its spine recess and is itself engaged within a tubular sheath. Lead oxide particulate material in a highly fluid slurry form is introduced into the annular space between each spine and its corresponding tubular sheath through the slurry access ports penetrating the foot.

2. Description of the Prior Art

Lead acid secondary cells comprising two substantially lead electrodes in contact with sulfuric acid electrolyte are well known to the art and are utilized in a variety of applications, including starting, lighting and ignition batteries for internal combustion engines and electrical systems, stationary batteries for powering communications systems, electrical utilities, computer systems, and for providing emergency power, motive power batteries to provide power for propulsion of lift trucks, mining equipment, and the like, and special purpose batteries such as aircraft, marine, military, and small, sealed batteries for consumer use. Each of the electrodes must be provided with the appropriate active material prior to cell operation, since it is the active material which provides reactants for the reversible electrochemical reactions taking place during charge and discharge of the cell. The electrodes provide conductive support structures for the active material which act as current collectors for the cells.

Conventional negative electrodes for use in lead-acid secondary cells comprise lead or lead alloy grids. The open spaces and surfaces of the grid are pasted with a paste-like mixture comprising one or more oxides of lead which is subsequently reduced, forming the electrochemically active material known as sponge lead. Positive electrodes may comprise the same type of lead or lead alloy grids, or they may comprise a tubular plate arrangement wherein a plurality of individual lead or lead alloy spines are aligned on a conductive bar, each spine is enveloped by a porous tubular sheath, and active material, in the form of lead dioxide, is provided in the annular space between the spines and porous tubes, and is confined by the tubular sheath. Typically, a mixture comprising lead oxide compounds is introduced into the annular space, and the positive electrode assembly is then treated to convert the lead oxide compounds to the electrochemically active material, lead dioxide.

Tubular plate positive electrodes are conventionally prepared by pouring fine lead oxide powder into the annular space between each spine and its corresponding tubular sheath through the unobstructed, open end of the electrode assembly while the electrode assembly is being vibrated. This conventional method of filling tubular plate electrodes with active material has several serious shortcomings, and particularly serious is the environmental hazard of human exposure to the lead oxide powder. Utilization of fine lead oxide powders according to this conventional filling process presents a serious health hazard to those working in the general area of the filling operations, and also results in substantial materials losses. The cost of protecting personnel from the health hazards of airborne lead oxide dust are prohibitive, and recovery of airborne lead oxide powder for subsequent utilization is very difficult. Furthermore, filling tubular plate electrodes with lead oxide dust in this manner often results in non-uniform filling and electrodes filled in this manner may demonstrate unsatisfactory performance.

After filling the annular space between each spine and its porous tubular sheath with lead oxide powder according to conventional methods, the electrode is typically "footed" to seal the open ends of the tubular sheaths. The conventional methods of filling tubular plate electrodes with fine lead oxide powder require very precise regulation and metering of the lead oxide powder to ensure that no void spaces remain between the lead oxide powder level and the foot, which may extend for a short distance into the tubular sheaths, and to ensure that the electrode has not been overfilled with lead oxide powder so that the foot cannot be fully inserted. Precise regulation of the lead oxide powder filling level is difficult to achieve. In addition, the spines may become misaligned during filling with lead oxide powder, and subsequent insertion of the foot may bend the misaligned spines. All of the aforementioned shortcomings of conventional tubular plate electrode lead oxide powder filling methods adversely affect the performance and reliability of the electrode.

In view of the environmental hazards of conventional lead oxide powder filling methods and unsatisfactory performance of electrodes filled with lead oxide dust in the conventional manner, several alternative techniques have been proposed for providing tubular plate electrodes with active material. U.S. Pat. No. 4,076,058 teaches a method and apparatus for introduction of active material in an aqueous slurry form into the porous envelopes of tubular plate electrodes. This patent teaches introduction of a liquid slurry of low viscosity directly into the open end of porous envelopes of tubular plate electrodes at low pressure, with the arrangement of outlet nozzles of an injection manifold corresponding to the arrangement of tubular envelopes and each outlet nozzle of the injection manifold having an outer diameter corresponding to the inner diameter of the porous tubular envelopes. Each tubular plate must be clamped at a plate filling station and aligned with an injection manifold comprising rigid feed tubes prior to filling.

U.S. Pat. No. 3,885,988 teaches a process and apparatus for filling tubular plate electrodes with lead oxide material in a slurry form wherein supplementary water is added to a paste-like lead oxide material to form a suspension and the suspension is forced into the individual tubes under pressure to prevent settling of the particulate lead oxide material. A plurality of nozzles corresponding to the number and arrangement of tubes in the tubular plate electrodes are fitted into or over the open ends of the tubes during injection.

U.S. Pat. No. 3,949,793 teaches a method for filling tubular plate electrodes with an active material paste wherein the active material paste is pumped through an extruder head into the open tubes of a tubular plate electrode which are aligned and retained in a nozzle block, the nozzles fitting into the open ends of the tubular sheaths. U.S. Pat. No. 4,039,730 teaches a similar method for filling tubular plate electrodes with active material in a paste form wherein the paste material additionally comprises electrolyte-resistant fibers such as glass or plastic. The electrolyte-resistant fibers occlude pores in the tubular wall to retain active material within the tubular envelope, thereby reducing extrusion of the active material through the tubular envelope, and increasing the strength of the active material.

U.S. Pat. No. 4,146,063 teaches a method for filling tubular plate electrodes with an active material in paste form wherein the porous tubular sheath is filled with paste by centrifugation, surplus liquid being removed through the porous sheath during centrifugation.

U.S. Pat. No. 4,366,214 teaches a device for sealing the tubes of a tubular plate electrode comprising separate sleeves for each tube, each sleeve having a central through hole for retaining a spine. The sealing device is applied after the tubes have been filled with active material.

U.S. Pat. No. 4,011,370 teaches fixation of bottom strips to tubular plate electrodes prior to filling the tubular plate electrodes with active material in a powder form. To permit filling of the tubular sheaths after the bottom strip has been attached, the bottom strips are provided with hinged closure sections formed integrally with the base, which open to permit filling of the tubular sheaths with lead oxide powder and close tightly after the sheaths have been filled. The '370 patent teaches filling of the tubular plate electrodes with active material in a powder form only, and the hinged closure sections are especially suitable for use with lead oxide powder filling processes. This method does not ameliorate the environmental hazards inherent in lead oxide powder filling processes, and it does not prevent misalignment of the spines during the filling process. The '370 patent teaches the additional feature of integral projections extending from each end of the bottom strip to facilitate suspension or other automated handling of the electrodes subsequent to filling.

The disadvantages of prior art powder filling techniques, and particularly the environmental hazard, have been described above and are fully set forth in the U.S. patents relating to filling tubular plate electrodes with lead oxide materials in a paste or slurry form. Filling tubular plate positive electrodes with active material in a slurry or paste form is preferable from an environmental standpoint, but prior art processes are very costly due to the specialized equipment required to generate sufficient pressures for extruding paste or injecting slurry directly into each of a plurality of aligned tubular sheaths. Precise regulation is required to fill to the proper level so that the foot may be fully inserted without leaving any void spaces between the foot and the active material. Upright alignment of the spine during filling is difficult to maintain using prior art filling techniques. The prior art slurry and paste filling methods are generally unsatisfactory.

SUMMARY OF THE INVENTION

It is an object of the present invention to provide an improved process and apparatus for filling tubular plate electrodes with lead oxide material in a highly fluid slurry form wherein tubular plate electrodes are footed prior to filling with lead oxide material, and lead oxide material in a highly fluid slurry form flows through slurry access ports penetrating the foot and into the annular space between each spine and its corresponding porous tubular sheath.

It is another objective of the present invention to provide a foot comprising a plurality of aligned projections corresponding to the arrangement and configuration of the spines and their corresponding tubular sheaths, each projection extending for a distance into the corresponding tubular sheath and having a recess corresponding to the configuration of the spine to retain and support the spine during filling and each projection provided with at least one slurry access port penetrating the foot to permit filling of the tubular sheaths with lead oxide material in a highly fluid slurry form through the slurry access ports in the foot.

It is still another objective of the present invention to provide a sealing element for sealing the slurry access ports after filling with lead oxide material to prevent leakage of lead oxide materrral or electrolyte through the slurry access ports and to prevent contamination of the electrode from external sources.

It is another object of the present invention to provide a process and apparatus for filling tubular plate electrodes with lead oxide material in a highly fluid slurry form whereby a plurality of tubular plate electrodes may be filled simultaneously by means of a simplified filling process requiring little or no specialized equipment.

It is yet another objective of the present invention to provide a simple and cost-efficient process and apparatus for filling tubular plate electrodes with lead oxide particulate material in a highly fluid slurry form which overcomes the deficiencies of the prior art processes and apparatus.

According to the present invention, an apparatus referred to as a "foot", is installed on the open end of the tubular plate electrode assembly prior to filling the annular spaces between the spines and their corresponding tubular sheaths with lead oxide material. The foot has a plurality of projections aligned with and corresponding to the number and configuration of spines and tubular sheaths in a tubular plate electrode. The projections extend integrally from a generally rectangular base portion. When the foot is installed on the tubular plate electrode assembly, each projection extends for a distance into the corresponding tubular sheath and the base portion of the foot, which is slightly wider than the projections, and which has a uniform width along the length of the electrode, serves as a stop and abuts the accessible openings of the tubular sheaths. The projections of the foot thus maintain the tubular sheaths in proper alignment. In addition to aligning the tubular sheaths, each projection is provided with a recess which conforms to the configuration of the spine, and which engages the spine as the projections of the foot are inserted into the tubular sheaths. The projections of the foot support and cente each spine within its corresponding tubular sheath during filling with lead oxide material.

Each projection of the foot is provided with at least one slurry access port penetrating both the base portion and each projection comprising the foot to provide access to the annular space between the spine and the tubular sheath from outside the foot. In a preferred embodiment, two slurry access ports are provided in each projection, the slurry access ports aligned symmetrically opposing one another on either side of the spine recess. Alternative arrangements and numbers of slurry access ports may be provided in each projection comprising the foot in a configuration which facilitates even filling of annular spaces between each spine and its corresponding tubular sheath with lead oxide material from a source external to the tubular plate electrode assembly.

The foot of the present invention may be adapted to accommodate various configurations of tubular plate electrodes. For example, tubular plate electrodes may be provided with spines having a generally oblong or generally circular cross section. Accordingly, the spine recess in each projection of the foot may be shaped and sized to conform to the generally oblong or generally circular configuration of the spines. Similarly, the projections of the foot are shaped to conform to the configuration of the tubular sheaths, which is generally oblong or circular, depending upon the configuration of the lead spines. The configuration of the spines and the tubular sheaths may alternatively provide a square, rectangular, or elliptical cross section.

In order to seal the slurry access ports to prevent egress of active material or contamination of the active material in the tubular sheath from external sources, a sealing element is provided which comprises a plurality of prongs extending from and integral with a generally rectangular base portion, the prongs aligned with and corresponding to the configuration of the slurry access ports. The prongs of the sealing element are inserted into the corresponding slurry access ports until the base portion of the sealing unit abuts the base portion of the foot. In a preferred embodiment, the dimension of the base portion of the sealing element corresponds to the dimension of the base portion of the foot so that the base portions are aligned and their adjacent surfaces are flush when the sealing element is installed to provide convenient handling of the tubular plate electrodes and to enable alignment of a series of tubular plate electrodes by simply aligning the electrodes with their foot portions abutting one another.

In operation, the foot according to the present invention is installed on a tubular plate electrode prior to filling the annular spaces between the spines and their corresponding tubular sheaths with lead oxide material. A tubular plate electrode assembly comprising a plurality of aligned lead or lead alloy spines extending from a conductive bar with a porous tubular sheath enveloping each individual spine along its entire length, is footed prior to filling the tubular sheaths with lead oxide particulate material according to the process of the present invention. The tubular sheaths enveloping each spine are preferably joined to one another to form a unified tubular sheath assembly, but individual, separated tubular sheaths may also be used. The foot, according to the present invention, is inserted on the open end of the tubular plate electrode assembly opposite the conductive bar, with one projection extending into the open end of each tubular sheath and engaging the corresponding spine in its spine recess. In this way, the foot supports and aligns both the tubular sheaths and their corresponding spines.

The flexible properties of the foot facilitate installation of the foot on the tubular plate electrode. In addition, the insertion end of each projection may be slightly beveled to provide ease of insertion of the projections into the corresponding tubular s-heaths. In much the same fashion, the insertion end of the spine recess may be slightly flared to facilitate initial positioning of the spine within the recess. The foot is securely retained on the assembly by means of friction since the interior surfaces of the spine recesses conform closely to the configuration of the spines engaged therein and the configuration of the exterior surfaces of the projections conforms closely to the configuration of the tubular sheaths in which they are inserted.

After the foot has been installed on the tubular plate electrode assembly, and is securely retained thereon, the annular spaces between the spines and their corresponding tubular sheaths are filled with lead oxide material in a highly fluid slurry form through slurry access ports penetrating the foot. In a preferred embodiment of the filling process of the present invention, a plurality of tubular plate electrode assemblies, each having a foot securely retained thereon, are aligned one next to the other with the foot portions of each tubular plate electrode uppermost and adjacent foot portions aligned and abutting one another. The plurality of aligned tubular plate electrodes with their foot portions abutting are preferably confined along the edges of the foot portions forming the outer perimeter of the aligned electrodes by a rigid, non-porous confining structure in close contact with the edges of the foot portions forming the perimeter of the aligned plates, and extending for a distance upwardly from the top surface of the foot portions. It is especially preferred that a vibrating mechanism, such as a jig, is provided to vibrate the array of tubular plate electrodes aligned and securely retained within the confining means.

According to the process of the present invention, lead oxide material is introduced into the electrode in a highly fluid slurry comprising lead oxide particulates suspended in a liquid solution and preferably in an aqueous solution. The highly fluid lead oxide slurry is dispensed onto the foot portions forming the upper surface of the confined array of electrodes to cover the foot portions of the aligned tubular plate electrodes, and excess slurry is retained on the upper surface of the foot portions by the confining structure. The highly fluid lead oxide slurry passes through slurry access ports in the foot portions and into the annular space between each electrode and its corresponding tubular sheath. The slurry flows through the slurry access ports in the foot as a result of gravitational forces, and no external pressure need be applied to the assembly. The tubular plate electrodes are preferably vibrated during filling to facilitate even distribution of the lead oxide slurry through all slurry access ports in the aligned foot portions of the electrode assemblies, and to facilitate passage of excess liquid through the porous tubular sheaths.

As the highly fluid lead oxide slurry flows into the annular space between each spine and its corresponding tubular sheath through slurry access ports in the foot, the incoming slurry migrates to the existing level of lead oxide material within the tubular sheath. Excess liquid drains directly through the porous walls of the tubular sheath, depositing wetted lead oxide particulates in the annular space. The porous tubular sheaths confine the lead oxide particulate material within the annular space. Liquid penetrating the porous tubular sheaths is permitted to drain, and it contains a substantially lower concentration of lead oxide particulates, since the closely abutting foot portions of the array of tubular plate electrodes do not permit passage of slurry therebetween, and the confining means does not permit leakage of lead oxide slurry along the perimeter of the array of electrodes. The fluid drained during the filling process may be collected, and any lead oxide particulates may be separated and reused.

As excess fluid drains through the porous tubular sheaths, wetted lead oxide particulates are uniformly distributed within the annular spaces. Filling with the lead oxide slurry continues until the level of particulate lead oxide in the annular spaces reaches the surface of the projections on the foot. Filling of the annular spaces with lead oxide material occurs at a uniform rate as long as an even and uninterrupted layer of lead oxide slurry is maintained overlaying the aligned foot portions during filling. The lead oxide slurry may be metered to provide the appropriate amount of lead oxide particulates to completely fill all of the tubular plate electrodes in the array. Visual examination of the electrode assemblies to determine at what point complete filling has been achieved is also, of course, possible.

Tubular plate electrodes filled with lead oxide particulates according to the present invention are pickled, cured and formed according to conventional methods to convert the lead oxide particulates to the activated lead dioxide form. Suitable methods are well known to the art. Since liquid is present in the filled electrodes only in quantities which wet the particulates, only a very slight adjustment, or none at all, need be made to the concentration of pickling and/or forming solutions to compensate for the small amount of liquid present.

The process of the present invention provides uniform filling of tubular plate electrodes with lead oxide particulates by means of a simplified process which requires little or no complex machinery, and which achieves filling with lead oxide material solely by gravitational forces. The process of the present invention provides uniform filling of the tubular plate electrodes with active material, and facilitates complete filling of the annular spaces eliminating void spaces which result from incomplete filling, blockage of a portion of the tubular sheath, misalignment of the spine within the tubular sheath, or incomplete insertion of the foot after filling with lead oxide material. The process and apparatus of the present invention may be adapted for use with different designs and configurations of tubular plate electrodes by simply modifying the specific configuration and dimensions of the foot and the sealing unit.

BRIEF DESCRIPTION OF THE DRAWINGS

The above mentioned and other features of the present invention, and the manner of obtaining them, will become apparen-t and the invention will be best understood by reference to the following description of preferred embodiments read in conjunction with the accompanying drawings, in which:

FIG. 1 shows an exploded perspective view, partly in cross section, of a tubular plate electrode of the present invention;

FIG. 2 shows an enlarged side view, partly in cross section, of a portion of a foot according to the present invention with a sealing unit inserted;

FIG. 3 shows a view from below the foot portion of FIG. 2 along line 3—3 in FIG. 2;

FIG. 4 shows an enlarged side view, partly in cross section, of a portion of another foot according to the present invention; and FIG. 5 shows a view from below the foot portion of FIG. 4 along lines 5—5 in FIG. 4.

DESCRIPTION OF PREFERRED EMBODIMENTS

As shown in FIG. 1, a tubular plate electrode assembly for use in lead-acid secondary cells utilizing lead dioxide active material at the positive electrode comprises a plurality of substantially lead spines 25 extending from a conductive bar 28 provided with lug 29 for the transmission of current. Spines 25 comprise substantially pure lead or lead alloys, such as antimonial lead alloys which are well known to the art and typically have a generally oblong or circular cross section. The number of spines is variable depending upon the type of cell desired, and the length and configuration of the spines is variable depending upon the desired cell capacity. The process and apparatus of the present invention may be adapted to conform to different spine configurations. It is preferred that each spine 25, in the region where it adjoins conductive bar 28, is provided with a tapered section 26 and an enlarged support section 27, or equivalent supporting structure. Spines 25 may be provided with centering fins or the like as is known to the art.

Tubular sheath assembly 20 comprises a plurality of porous tubular sheaths 21 enveloping spines 25 for their entire length. The cross-sectional configuration of porous tubular sheaths 21 preferably corresponds approximately to the cross-sectional configuration of spines 25, and annular space 22 is formed therebetween. It is preferred that porous tubular sheaths 21 arranged adjacent one another are integral to form a one-piece tubular sheath assembly which may be installed as a unit over the plurality of aligned spines 25 comprising the tubular plate electrode assembly. Enlarged support sections 27 of spines 25 preferably correspond in configuration and size to the inner diameter of tubular sheaths 21. In a tubular plate electrode assembly as shown in FIG. 1, the tubular porous sheaths 21 extend to and abut conductive bar 28 and conform closely to the configuration of enlarged support sections 27 to prevent the egress of particulate material from annular spaces 22.

Porous tubular sheaths 21 preferably comprise a woven or non-woven fabric, such as polyester, polyethylene, blends of polyester and polyethylene, glass and/or fiberglass fibers, and the like. Tubular sheaths 21 are sufficiently porous to permit the free passage of fluid, and sufficiently supportive to retain and confine particulate lead oxide and/or lead dioxide active material in annular spaces 22. A suitable range of porosity of tubular sheaths 21 is from about 40 percent to about 90 percent porous. Porous tubular sheaths 21 may be treated with resins, heat treated, provided with a supporting porous plastic sheath, or the like, as is known in the art to impart sufficient rigidity.

As shown in FIG. 1, tubular plate electrode foot 10 comprises base portion 11 and a plurality of aligned projections 12. The number, alignment and configuration of projections 12 corresponds to the number, alignment and configuration of spines 25 and tubular sheaths 21 comprising the tubular plate electrode assembly. Projections 12 are shaped and sized for insertion into tubula sheaths 21. Each projection 12 is provided with an internally directed spine recess 13, as clearly shown in FIGS. 2 and 4, the cross section of spine recess 13 conforming closely to the cross section of spines 25. FIGS. 2 and 3 show an enlarged view of a projection 12 of foot 10 which is adapted for use with spines and tubular sheaths having a generally oblong cross section and FIGS. 4 and 5 show an enlarged view of a projection 12 of foot 10 which is adapted for use with spines and tubular sheaths having a generally circular cross section.

Installation of foot 10 on the tubular plate assembly is accomplished by insertion of each projection 12 into the corresponding tubular sheath 21. At the same time, each spine 25 is located and retained in the corresponding spine recess 13. Projections 12 extend for a distance into the tubular sheaths 21, and in a preferred embodiment, extend from about 3 to about 12 mm into annular spaces 22. To facilitate insertion of projections 12 into tubular sheaths 21, each projection may be provided with a beveled insertion end 16 to provide an area of decreased cross-sectional surface area at the insertion end of each projection. Likewise, to facilitate the location of spines 25 within internally directed spine recesses 13, a flared portion 17 may be provided at the insertion ends of spine recesses 13 to provide an area of increased cross-sectional surface area.

Each projection 12 is provided with at least one slurry access port 15 penetrating base portion 11 and each projection 12 comprising foot 10. Slurry access ports 15 may have any convenient cross-sectional configuration, such as circular, oblong, square, rectangular or elliptical. In a preferred embodiment, two cylindrical slurry access ports 15 are provided symmetrically aligned and opposing one another on either side of spine recess 13. Additional slurry access ports may be provided in a regular arrangement which is symmetrical with respect to spine recesses 13. Slurry access ports 15 provide access to annular spaces 22 from the exterior of foot 10.

Slurry access ports 15 may be closed by means of sealing element 30 comprising base portion 31 and aligned prongs 32. Prongs 32 correspond in alignment and configuration to slurry access ports 15 and are dimensioned for insertion into slurry access ports 15. As shown in FIG. 2, prongs 32 may be provided with a tapered insertion end portion 33 to facilitate insertion of prongs 32 into slurry access ports 15. In a preferred embodiment, base portion 31 of sealing element 30 conforms to the configuration of base portion 11 of foot 10 so that upon installation of sealing element 30 on foot 10, the adjacent surfaces of base portion 31 and base portion 11 are flush with one another. This feature provides convenient handling of the tubular plate electrode assembly, and permits alignment of a plurality of tubular plate electrodes, shown schematically in FIG. 1, as aligned tubular plate electrodes 35 and 36. In addition, base portion 31 may be provided with extensions 19 as integral continuations on both ends of foot 10 to facilitate automated handling of the tubular plate electrode assemblies.

The foot and the sealing element preferably comprise a flexible plastic material which is not reactive with the conductive lead or lead alloy spine, the lead oxide or lead dioxide active material, or the sulfuric acid electrolyte. Suitable plastics, such as polyvinylchloride, low density polyethylenes, high density polyethylenes, polyesters, and the like, are well known to the art, and suitable methods of fabricating the foot and sealing element, including integral projections and prongs, recesses and slurry access ports in such materials are well known.

According to the process of the present invention, foot 10 is installed on a tubular plate assembly comprising a plurality of substantially lead spines 25 extending from conductive bar 28, each spine 25 enveloped by a porous tubular sheath 21. As each projection 12 is inserted into the corresponding tubular sheath 21, the corresponding spine 25 is retained within a spine recess 13. Projections 12 are inserted into annular spaces 22 until the opening of porous tubular sheaths 21 abuts the surface of base portion 11. The footed tubular plate electrode assembly provides convenient handling as a unit, and presents little danger of disassembly.

After tubular plate electrode assemblies have been footed according to the process of the present invention, lead oxide particulate material in a highly fluid slurry form is introduced through slurry access ports 15 and into annular spaces 22. Suitable compositions and combinations of different types of lead oxide particulates are well known to the art and may be utilized with the process of the present invention. Suitable lead oxide particulates preferably range in size from about $0.1\mu$ to about $50\mu$ in diameter and the lead oxide particulates preferably have a mean diameter of about $2.0\mu$ to about $5.0\mu$. The desired lead oxide composition is mixed with a liquid medium to distribute the particulates throughout the liquid medium, forming a highly fluid slurry. The highly fluid slurry preferably comprises about 35 percent to about 85 percent lead oxide particulates, by weight, and about 5 percent to about 35 percent lead oxide particulates, by volume. The density of the slurry is preferably from about 1.5 $gm/cm^3$ to about 4.1 $gm/cm^3$. Other compounds, such as stabilizers, fillers, bulking agents, suspending agents, flocculents, or the like, which are well known to the art, may be added to the lead oxide slurry.

In a preferred embodiment of the process of the present invention, a plurality of tubular plate electrode assemblies are aligned with their foot portions abutting one another, as shown in FIG. 1. A rigid, non-porous confining structure preferably confines the edges of the foot portions forming the perimeter of the aligned electrode assemblies and extends for a distance above the top surface of the foot portions to enable maintenance of a slurry layer overlaying the exposed foot portions of the electrode assemblies. Particulate lead oxide material in a highly fluid slurry form is deposited evenly on the upper surfaces of the aligned foot portions and flows through slurry access ports 15 into annular spaces 22. Excess fluid in the lead oxide slurry drains through porous tubular sheaths 21 and wetted particulate lead oxide material is retained in annular spaces 22 and confined by porous tubular sheaths 21. The tubular plate electrode assemblies are preferably vibrated during filling with lead oxide slurry to assure even distribution of the slurry through all slurry access ports and to prevent sedimentation of lead oxide particulates in the slurry prior to deposition in annular spaces 22. An even layer of lead oxide slurry is maintained on the upper surface of the foot portions of the electrode assemblies during filling and is retained thereon by the confining means.

As excess liquid drains through porous tubular sheaths 21, wetted lead oxide particulates are evenly distributed within annular spaces 22. Filling with lead oxide slurry continues until the level of wetted lead oxide particulates deposited in annular spaces 22 reaches the level of projections 12 of foot 10. Filling is then discontinued, the tubular plate electrode assemblies are removed from the confining means, and pickled cured, and formed according to conventional methods. After tubular plate electrode assemblies have been filled and removed from the confining means, the electrode assemblies may be rinsed with a water spray to remove any lead oxide particulates adhering to the exterior of the tubular sheaths. Rinsing in this fashion permits recirculation and reuse of lead oxide particulates and improves the performance of tubular plate electrodes. Tubular plate electrode assemblies are typically pickled by immersion in a sulfuric acid/water solution for a time period ranging from a few minutes to many hours. The electrode assemblies are than cured utilizing a controlled drying process and formed by immersion in a sulfuric acid/water solution while an electrical current is applied to convert the lead oxide particulates to lead dioxide active material. Sealing element 30 may be installed on the electrode assemblies by insertion of prongs 32 into slurry access ports 15 after filling with lead oxide particulates is complete.

The following specific example is set forth for the purpose of illustration and is not intended to limit the present invention in any way.

EXAMPLE

Tubular plate electrodes having eleven (11) oblong spines aligned on a conductive bar provided with a lug were assembled as shown in FIG. 1. The tubular plate electrodes comprised 1.8 percent antimony and the balance lead. Each spine had an oblong cross-sectional configuration, about 4.8 mm long at its longest point and 2.8 mm wide at its widest point. The tubular plate electrodes had an overall plate width of about 13.63 cm and an overall plate height of about 33.00 cm. A woven polyester tubular sheath assembly comprising eleven (11) oblong tubes, each tube about 12.1 mm long at its longest point and 5.4 mm wide at its widest point, with a polyethylene foot as shown in FIG. 1 located therein, was positioned over the spines until the tubular sheath was well seated against the conductive bar and the spines were located and seated in the spine recesses of the foot. The volume available for filling with active material was about 103.6 cm$^3$.

A lead oxide particulate composition was prepared comprising about 25 percent $Pb_3O_4$ and about 75 percent PbO. The lead oxide particulate composition was mixed with water to form a slurry as follows: 45.35 Kg lead oxide particulates were mixed with 11.24 Kg water, to form a slurry having a density of about 3.75 gm/cm$^3$.

Seventeen tubular plate electrode assemblies were aligned, foot portions uppermost, in a confining structure extending around the perimeter of the aligned plates and for a distance above the foot portions. The confining means sealed the perimeter of the aligned feet and caused the aligned feet to closely abut one another to prevent the flow of slurry between the aligned plates and around their perimeter. Aqueous lead oxide slurry as described above was introduced onto the top surfaces of the aligned foot portions in the confining structure and a vibrating mechanism was activated. The slurry level was maintained above the top surfaces of the foot portions during the filling process. The vibrating mechanism was inactivated after about three (3) minutes of filling and the plates were removed from the confining structure. The wet, filled active material density was about 4.4 gm/cm$^3$.

The filled tubular plate electrodes were rinsed with a high velocity water spray to remove lead oxide particulates from the exterior surface of the tubular sheath. The rinsed plates were pickled in a sulfuric acid solution (1.400 specific gravity) for 20 minutes and briefly dipped in water to rinse off any sulfuric acid adhering to the surface of the plates. The pickled electrodes were then dried for 24 hours at 50° C. The electrodes were assembled into nine plate cell elements (four positive and five negative electrodes) and formed according to conventional methods. These cells have presently accumulated 200 cycles on an 80 percent depth of discharge test regime with no indication of degradation in performance.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. A process for filling a tubular plate electrode assembly with a lead oxide particulate slurry comprising lead oxide particulates suspended in fluid, said electrode assembly comprising a plurality of substantially lead spines with a porous tubular sheath enveloping and extending for the length of each said spine, forming an annular space between each said spine and each said tubular sheath, said annular spaces accessible from a first end and sealed at a second end, said process comprising the steps of:

installing a tubular plate electrode foot partially sealing said first end of said annular spaces and having at least one slurry access port penetrating to each said annular space;

dispensing said lead oxide particulate slurry onto an upper, exposed surface of said tubular plate electrode foot;

introducing said lead oxide particulate slurry into said annular spaces through said slurry access ports in said foot and confining said lead oxide particulates within said porous tubular sheaths; and draining excess fluid through said porous tubular sheaths, thereby depositing wetted lead oxide particulates in said annular spaces between said spines and said porous tubular sheaths.

2. A process described in claim 1 additionally comprising the step of vibrating said tubular plate electrode assembly during said filling of said electrode assembly with said lead oxide particulate slurry.

3. A process as described in claim 2 wherein said lead oxide particulate slurry comprises about 35 percent to about 85 percent lead oxide particulates, by weight.

4. A process as described in claim 2 wherein said lead oxide particulate slurry comprises about 5 percent to about 35 percent lead oxide particulates, by volume.

5. A process as described in claim 2 wherein said lead oxide particulate slurry has a density of from about 1.5 gm/cm$^3$ to about 4.1 gm/cm$^3$.

6. A process as described in claim 2 wherein a plurality of tubular plate electrode assemblies are filled simultaneously by means of dispensing said lead oxide particulate slurry onto a plurality of said tubular plate electrode assemblies aligned with their foot portions uppermost and abutting.

7. A process as described in claim 6 additionally comprising confining said plurality of aligned tubular plate electrode assemblies with their foot portions aligned and abutting with a rigid, non-porous confining structure closely contacting an outer perimeter of said aligned foot portions and extending for a distance thereabove prior to dispensing said lead oxide particulate slurry onto said tubular plate electrode assemblies.

8. A process as described in claim 7 wherein said lead oxide particulate slurry is continuously dispensed onto said pluality of tubular plate electrode assemblies to maintain a uniform layer of said lead oxide particulate slurry on the upper surfaces of said foot portions during filling of said electrode assemblies.

9. A process as described in claim 8 wherein said lead oxide particulate slurry comprises about 35 percent to about 85 percent lead oxide particulates, by weight.

10. A process as described in claim 8 wherein said lead oxide particulate slurry comprises about 5 percent to about 35 percent lead oxide particulates, by volume.

11. A process as described in claim 8 wherein said lead oxide particulate slurry has a density of from about 1.5 gm/cm$^3$ to about 4.1 gm/cm$^3$.

12. A process according to claim 1 wherein said lead oxide particulate slurry is dispensed onto said tubular plate electrode foot until said wetted lead oxide particulates fill said annular spaces to the level of said tubular plate electrode foot.

13. A process according to claim 12 additionally comprising sealing said slurry access ports after filling said annular spaces with said wetted lead oxide particulates by installing a sealing element.

14. A process according to claim 13 additionally comprising rinsing said electrode assemblies after sealing said slurry access ports and removing lead oxide particulates adhering to said electrode assemblies; and collecting, separating and recirculating said lead oxide particulates removed by rinsing.

15. A process according to claim 1 wherein said tubular plate electrode foot is installed by engaging said spines in recesses in said tubular plate electrode foot.

16. A process according to claim 15 additionally comprising supporting and centering said spines with respect to said porous tubular sheaths by engagement of said spines in said recesses of said tubular plate electrode foot during said filling said tubular plate electrode assembly with said lead oxide particulates.

17. A process according to claim 1 additionally comprising metering said lead oxide particulate slurry as it is dispensed on said tubular plate electrode foot to provide an amount of lead oxide particulates to completely fill all of said annular spaces.

18. A process according to claim 1 wherein said lead oxide particulates are from about 0.1 to about 50 in diameter.

19. A process according to claim 1 wherein said lead oxide particulates are suspended in an aqueous fluid.

20. In a process for filling a tubular plate electrode assembly with a lead oxide particulate slurry comprising lead oxide particulates suspended in fluid, said electrode assembly comprising a plurality of substantially lead spines with a porous tubular sheath enveloping and extending for the length of each said spine, forming an annular space between each said spine and each said tubular sheath which is accessible from a first end and sealed at a second end, said process comprising the steps of introducing said lead oxide particulate slurry into said annular spaces and confining said lead oxide particulates within said porous tubular sheaths, and draining excess fluid through said porous tubular sheaths, thereby depositing wetted lead oxide particulates in said annular spaces between said spines and said porous tubular sheaths, the improvement comprising:

installing a tubular plate electrode foot partially sealing said first end of said annular spaces and having at least one slurry access port penetrating to each said annular space and dispensing said lead oxide particulate slurry onto an upper, exposed surface of said tubular plate electrode foot.

* * * * *